May 16, 1961 A. WEISBERG 2,984,008
AIR AND WATER CONTROL FOR DENTAL DRILL
Filed Nov. 12, 1957

INVENTOR:
ALEXANDER WEISBERG
BY Fulwider, Mattingly
and Huntley
ATTORNEYS.

_United States Patent Office_

2,984,008
Patented May 16, 1961

2,984,008
AIR AND WATER CONTROL FOR DENTAL DRILL
Alexander Weisberg, 700 S. La Brea, Los Angeles, Calif.
Filed Nov. 12, 1957, Ser. No. 695,831
7 Claims. (Cl. 32—28)

The present invention relates to an improved dental instrument, and more particularly to means for providing a fluid spray in conjunction with the handpiece of a conventional dental unit.

In dental surgery the operations of drilling, grinding or buffing teeth, may result in the development of substantial heat. The heat so developed accounts to a large extent for the excruciating pain which often accompanies these dental operations. It has therefore been proposed, to provide a fluid spray of either gas or liquid, or a combination of gas and liquid, to be directed upon the tooth undergoing dental surgery. The fluid spray thus maintains the temperature of the tooth at a degree where the intensity of pain is not as great, and also tends to maintain the operating area clear of loose particles.

It has been further proposed, to automatically form the spray simultaneously with the energization of the motor of a dental unit. Systems to perform this function have been very useful to avoid the annoying and time-consuming operation of turning the spray on or off each time the dental operation is commenced or halted.

Often, in performing dental surgery a need arises to control the content of the spray according to the operating speed of the dental engine. That is, for example, in the performance of a dental operation it may be desirable to utilize a spray of air while the engine is running at low speed, and to provide water in the spray when the engine reaches a higher speed. Furthermore, it is usually desirable that the spray contain no water until the dental engine reaches operating speed. The water in the spray which is directed into a patient's mouth, prior to actual dental operating, tends to obstruct the view of the teeth and fill the patient's mouth with unnecessary water.

In addition to the automatic control of the spray, it is desirable to provide an adjustment to regulate the amount of gas or liquid in the fluid spray. For example, it may be desired to use a spray consisting primarily of air during certain operations and a spray consisting primarily of water during other operations. To provide the desired fine adjustment of the spray content, prior systems have either utilized expensive and complex equipment or have utilized less-expensive apparatus which afforded only crude adjustability.

It is therefore an object of this invention to provide an improved system for affording a fluid spray for use in conjunction with a dental unit.

Another object of this invention is to provide a spray-forming system for use in conjunction with a dental unit, which enables fine control of the liquid and gas content in the spray.

A further object of this invention is to provide a dental-spray-forming system wherein the liquid and gas content of the spray is regulated automatically in accordance with the speed of the dental engine.

Still another object of this invention is to provide a simple self-contained system, generally universally applicable to various models of dental units without need for modification, which provides extremely fine control of a dental spray and which is economical to manufacture.

Still a further object of the present invention is to provide a system for use in conjunction with a dental unit for providing a fluid spray, the content of which is automatically changed in accordance with speed of the dental engine.

A still further object of this invention is to provide a fluid valve for use in a spray-forming system which has fine control and is economical to manufacture.

Still another object of the present invention is to provide a dental unit wherein conventional control means is employed in conjunction with both a motor-driven hand-piece and a turbine-driven handpiece.

One other object of the present invention is to provide an adjustable fluid valve, which is readily cleared of obstructing material.

These and other objects and advantages of the present invention will become apparent from the following specification and accompanying drawings in which.

Figure 1:
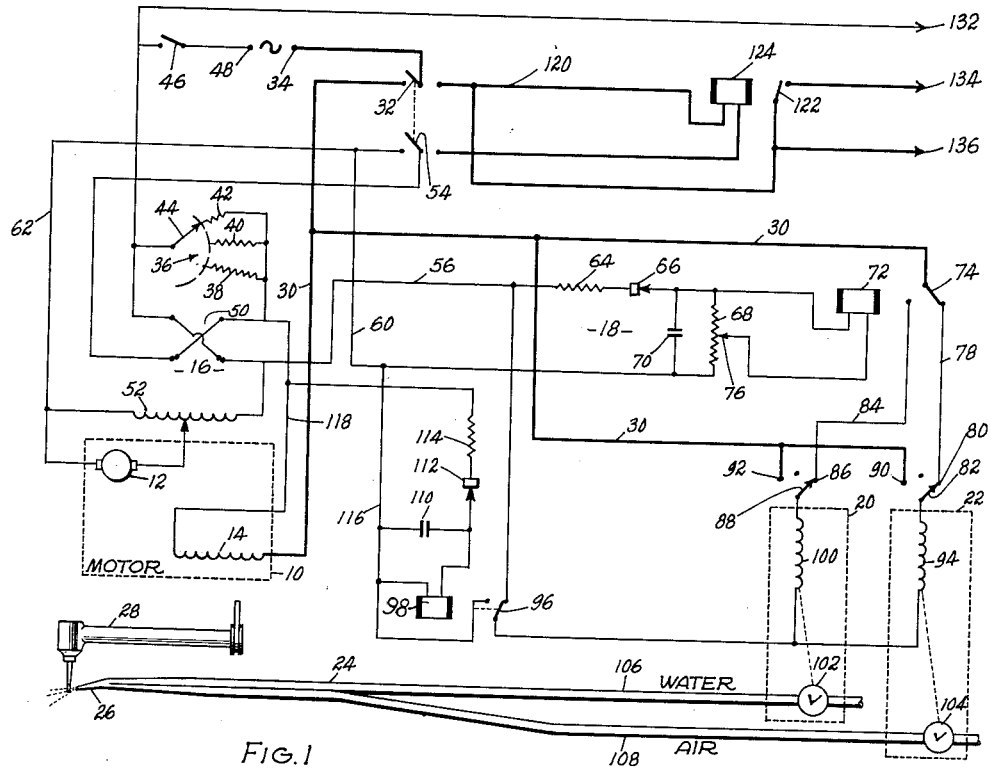
Figure 1 is a diagrammatic representation of a dental-spray control system constructed in accordance with the principles of the present invention.

Referring now to Figure 1, there is shown a dental motor 10 including an armature 12 and a field winding 14. The motor 10 functions to drive the dental engine in the described embodiment of the present invention. The speed of the motor 10 is regulated by a speed-control system generally indicated at 16. A control circuit, generally indicated at 18, is connected to the speed-control system 16, and functions to form a control signal utilized to control a pair of solenoid-operated valves 20 and 22 in accordance with the speed of the motor 10. The valves 20 and 22 serve to vary the amount of air and water which may pass through a double-channel tube 24 that is connected to a nozzle 26. The nozzle 26 is used in conjunction with a contra-angle or handpiece 28 so that the spray or fluid stream passing through the nozzle 26 is varied in accordance with the speed of the dental motor 10 driving the handpiece 28. Of course, the armature 12 of the motor 10 is connected by a mechanical connection (not shown) to drive the handpiece 28.

To consider the system now in greater detail, the field winding 14 is connected through a line 30 and contacts 32 to a terminal 34 which is adapted to be connected to a source of alternating current potential. The line 30 is shown in a heavier dimension than many of the lines of Figure 1. Lines, as the line 30 shown in heavy dimension, are connected directly to the terminal 34 through the contacts 32. This manner of illustration serves to more readily teach the embodiment of the present invention.

The field winding 14 in addition to being connected to the line 30 is connected to one terminal of a variable-resistance circuit 36. The variable-resistance circuit 36 includes resistors 38, 40 and 42 which may be individually connected to provide the resistance of the variable resistance circuit 36 by a rotary switch 44 which includes an open circuit position. The rotary switch 44 is connected through an on-off switch 46 to a terminal 48 that is connected to receive alternating current potential with the terminal 34. Upon closing the switch 46 and positioning the contacts 32 to the left, an alternating current flows through the field winding 14 and the variable resistance circuit 36.

Connected across the variable resistance circuit 36 is a reversing switch 50. The reversing switch 50 connects a serial circuit including the primary of a variable transformer 52 and contacts 54 across the variable resistance circuit 36. The virtual secondary of the transformer 52 is connected to energize the armature 12. The variable transformer 52 is an auto-transformer in the embodiment of Figure 1; however, it is to be understood that various forms of variable transformers could be employed.

The variable resistance circuit 36 and the variable transformer 52 jointly function to control the speed of the motor 10. The manner of this speed control will be considered to some extent herein; however, this method of speed control is considered in detail in applicant's co-pending patent application Serial No. 651,740, filed April 9, 1957 and since abandoned.

In an operating system, the on-off switch 46, the variable resistance circuit 36, and the reversing switch 50 may be incorporated in a foot-controller (not shown) which is conventionally used in association with a dental unit.

The control circuit 18 is connected across the primary or input terminals of the variable transformer 52. One line 46 (to the control circuit 18) is connected directly to the variable transformer 52, and another line 60 (to the circuit 18) is connected to the variable transformer 52 through a line 62. As a result of these connections, the potential between the lines 56 and 60 coincides to the potential developed across the input to the variable transformer 52. The line 56 is serially connected through a current-limiting resistor 64, a rectifier 66 and a parallel circuit including a potentiometer 68 and a capacitor 70 to line 60. A portion of the voltage develop across the potentiometer 68 is applied through a variable tap 76 to a relay 72 having contacts 74.

The movable contact of the contacts 74 is directly connected to the terminal 34 as indicated by heavy line 30. The right stationary contact of the contacts 74, is connected through a line 78 to a stationary contact 80 of a three-position switch 82.

The left stationary contact of the contacts 74 is connected through a line 84 to a contact 86 of a three-position switch 88. The center position of each of the switches 88 and 82 is electrically isolated from the rest of the circuit and is therefore a neutral or "off" position for these switches. The left stationary contacts 90 and 92 of the switches 82 and 88, respectively are connected to the line 30.

The movable contact of the switch 82 is connected through a solenoid 94, in the solenoid-operated valve 22, to the movable contact of contacts 96 of a relay 98. Similarly, the movable contact of the switch 88 is connected through a coil 100, in the solenoid-operated valve 20, to the movable contact of the contacts 96.

The solenoids 94 and 100 function to control valves 102 and 104, which are mounted to control the passage of fluid through the channels 106 and 108. The details of the valves 102 and 104 will be considered hereinafter. The channel 106 of the tube 24 carries water to the nozzle 26 while the channel 108 carries air.

The relay 98 with contacts 96 functions to maintain the proper operating potential for the solenoids 94 and 100, while the motor 10 operates at various speeds, and with different directions of rotation. The circuit containing the relay 98 is alternatively either shorted, or is connected across the input to the variable transformer 52, depending upon the position of the reversing switch 50. The relay 98 is connected in parallel with a capacitor 110 and this parallel combination is serially connected with a rectifier 112 and a resistor 114. The resistor 114 functions as a current-limiting device while the rectifier 112 and the capacitor 110 function to rectify the voltages applied to this circuit and enable the relay 98 to be of the direct-current type.

One terminal of the relay 98 is connected through the resistor 114 to a line 118 that is in turn connected to a terminal of the reversing switch 50. The line 116 from the relay 98 is connected to the line 60 which is in turn connected through the line 62 to the variable transformer 52. As a result of these connections, the circuit containing the relay 98 is either connected to a common point, or across the variable transformer 52, depending upon the position of the reversing switch 50.

The contacts 32 and 54 serve to switch the system to either operate in conjunction with the motor 10, or to operate in conjunction with an air turbine handpiece. When the system functions in conjunction with an air turbine, the contacts 32 and 34 are positioned to the right; however, when the system operates in conjunction with the motor 10, these contacts are positioned to the left.

The right stationary terminal of the contacts 32 is connected through a line 120 to a relay 124 and to the movable contact of normally-closed contacts 122, associated with the relay 124. The relay 124 is also connected to the right stationary contact of the contacts 54.

The system shown in Figure 1, when incorporated as a part of dental unit, enables fine variation of the fluid content of a spray, and further enables the content of the spray to be changed in accordance with the speed of the dental motor 10. Examples of sprays which may be provided include a spray constituting only air at lower speeds which automatically changes to an air-water spray at a higher speed. As another example, the spray may consist of only air at lower speeds and automatically change to water at higher speeds. The selection of the particular spray desired in accordance with motor speed is made by means of switches 82 and 88 which function to control the operation of the valves 102 and 104. As previously indicated, the valves 102 and 104 are adjustable to provide a fine control of the amount of fluid the valve will pass when it is open. These valves 102 and 104 will be considered in detail hereinafter.

The switch 82 serves to control the air in the spray. If the movable contact of the switch 82 is positioned to the left to touch the contact 90, then a circuit exists from the line 30, which is connected to the power terminal 34, through the solenoid 94, the contacts 96, the line 56, the reversing switch 50 (when in the forward position as shown) and through the switch 46 to the terminal 48. As a result, the solenoid 94 is continually energized and the valve 104 is continually open. The result is that air continually flows through the channel 108 of the tube 24 to the nozzle 26. Of course, as previously indicated the amount of air flowing is determined by the fine adjustment of the valve 104.

If the movable contact of the switch 82 is placed in the center position, the solenoid 94 is electrically isolated and is not energized. The result is that the valve 104 remains closed continually and no air is permitted to pass through the channel 108 to the nozzle 26.

Upon positioning the movable contact of the switch 82 to the right (as shown), automatic air control is effected, whereby the valve 104 is open at lower speeds and closed at higher speeds. This control is effected by the control circuit 18 generating a control signal which varies as the speed of the motor 10 and applying the control signal to the relay 72 to operate contacts 74.

The switch 88 may also be manually placed in one of three positions, depending upon the desired water content in the spray emitted from the nozzle 26. If the movable contact of the switch 88 is positioned to the left to touch the contact 92, then the solenoid 100 will be continually energized in the same manner as the solenoid 94 when the movable contact of this switch 82 is positioned to the left. When the solenoid 100 is continually energized, the valve 102 is continually open and water is passed through the channel 106. If the movable contact of the switch 88 is placed in the center position, whereupon the solenoid 100 is electrically isolated, the solenoid 100 is continually de-energized and the valve 102 is continually closed. As a result, no water passes through the channel 106.

When the movable contact of the switch 88 is placed in the right position to touch the contact 86, the solenoid is connected through the line 84 to the left stationary contact of the contacts 74. With the switch 88 in this position, automatic control of the solenoid 100 in accordance with the speed of the motor 10 is effected in the following manner. The relay 72 is energized when the motor 10 reaches a predetermined speed. Below the predetermined speed, the movable contact of the contacts 74 is positioned to the right; however, upon the motor 10 reaching the predetermined speed, the relay 72 is energized to a sufficient extent as to move the movable contact of the contacts 74 to the left to contact the line 84 and energize the solenoid 100.

If the switches 82 and 88 are placed in the states shown (movable contacts to the right), the solenoid 94 is energized at lower speeds to open the valve 104 and permit air to flow through the channel 108; then upon the motor 10 reaching a predetermined speed, the movable contact of the contacts 74 changes its position to energize the solenoid 100 and de-energize the solenoid 94. As a result, the valve 104 is closed while the valve 102 is opened. The result is that the spray emitted from the nozzle 26 is changed from air to water. Of course, various combinations may be effected by variously positioning the switches 82 and 88. For example, the switch 82 may be positioned to the left to provide air in the spray at all times while the switch 88 is positioned to the right to provide water in the spray only after the motor has reached a predetermined speed.

It is to be noted that the speed-responsive control described above may be employed with respect to different ranges of speed. That is, various ranges of speed may be selected by varying the transformer 52, and each such range of speed (as effected by the circuit 36) may employ automatic spray control.

The control of the valves 102 and 104, when the switches 82 and 88 are positioned to the right, is effected by a control signal that is developed from the speed control system 16. The details of this speed control system, and the manner in which the control signal is developed will now be considered.

The source of alternating current power applied between the terminals 34 and 48 causes a current to pass through the contacts 32, the line 30, the field winding 14, the variable resistance circuit 36 (in parallel with the variable transformer 52) and the switch 46. The switch 46 is mounted within a conventional foot-controller unit (not shown) and is closed whenever the foot pedal is moved. The position of the foot pedal determines the resistance of the variable resistance circuit 36 and also the state of the reversing switch 50. In the position shown, the reversing switch 50 will cause the motor 10 to run in a forward direction; however, when the pedal of the foot controller is moved in an opposite direction, the reversing switch 50 will be reversed and cause the motor 10 to run in a reverse direction.

The fact that there is current through the variable transformer 52 upon closure of the switch 46, causes a voltage to be developed across this transformer. The armature 12 is connected to the variable transformer 52 and a portion of the voltage developed across the transformer is applied to the armature. Of course, the position of the tap of the variable transformer 52 may be changed to vary the voltage applied to the armature 12 and provide different ranges of speed for the dental engine. During the normal use of the system, the variable transformer 52 is set in a particular position during a number of repeated energizations of the dental motor. During these repeated energizations, the variable-resistance circuit 36 is utilized to control the speed of the motor in the dental engine by the rotary switch 44 dwelling upon different of the resistors 38, 40 and 42 or in its open circuit position. When the variable-resistance circuit 36 provides a low resistance, the current through this circuit is increased thereby increasing the amount of current through the field winding 14. As a result of the increased current through field winding 14, an increased voltage is developed across the field winding and therefore less voltage is developed across the parallel combination of the variable-resistance circuit 36 and the variable transformer 52. Of course, the result of a smaller voltage across the variable transformer 52 is to reduce the voltage across the armature 12 thereby resulting in a lower speed.

Conversely, if the resistance presented by the variable-resistance circuit 36 is increased, the current through this circuit decreases resulting in a lesser voltage across the field winding 14, and a greater voltage across the variable transformer 52. The greater voltage developed across the variable transformer 52, the greater the voltage applied to the armature 12, therefore the higher the speed of the dental motor 10. It may therefore be seen, that as the resistance presented by the variable-resistance circuit 36 decreases (lowering the speed of the motor 10), the voltage across this resistance circuit 36 also decreases. If, however, the resistance of the resistance circuit 36 increases (thereby increasing the speed of the motor 10), the common voltage across the resistance circuit 36 and the transformer 52 increases. Therefore, the voltage across the variable transformer 52 may be employed as a control signal which varies directly as the speed of the motor and which may be utilized to control the fluid stream or spray from the nozzle 36. This voltage across the transformer 52 remains sufficiently constant during changes of the secondary tap, that the speed control system may be employed at many ranges of speed.

To form the speed-control signal, the voltage developed across the variable transformer 52 is rectified by the rectifier 66, smoothed by the capacitor 70 and applied to the potentiometer 68. Therefore, a direct current voltage is developed across the potentiometer 68 that is directly proportional to the speed of the motor 10 within a given range of speed. A portion of this voltage is applied from the potentiometer 68 to the relay 72 by the tap 76 to enable variation of the amount of voltage applied to the relay 72. By altering the voltage applied to the relay 72, the speed of the motor 10, within a given range, at which the relay 72 operates may be controlled.

At lower speeds, the voltage from the potentiometer 68 applied to the relay 72 from the tap 76 is low, and therefore the relay is positioned with the movable contact of the contacts 74 positioned to the right. However, at the some predetermined speed, when the voltage across the potentiometer 68 has built up to a predetermined level, the current through the relay 72 becomes adequate to motivate the movable contact of the contacts 74, thereby moving the movable contact to the left. It may therefore be seen, that at the lower speeds in a particular speed range, the movable contact of the contacts 74 dwells upon the right stationary contact; however, at higher speeds, the movable contact dwells upon the left stationary contact.

When the movable contact of the contacts 74 is positioned to the right, the solenoid 94 is energized to open the valve 104 and allow air to pass through the channel 108 to the nozzle 26. The valve 104 is opened by the current passing through the line 30, contacts 74, line 78, contacts 82, then the solenoid 94 and contacts 96, line 56, the reversing switch 50 and the switch 46.

When the movable contact of the contacts 74 is positioned to the left to dwell upon the left contact (upon the motor 10 reaching the predetermined speed) the solenoid 100 is energized thereby opening the valve 102 and permitting water to pass through the channel 106 to the nozzle 26. The circuit of energization for the solenoid 100 is from line 30 through the contacts 74, the line 84, the switch 88, then through the solenoid 100 and through the contacts 96, line 56, the reversing switch 50 and the on-off switch 46.

It is to be noted, that with the change in position of the switch 74 from the right to the left, the solenoid 94 is de-energized. Therefore, automatic cut-off of the air in the spray may be effected in the same manner that automatic cut-on of the water spray is effected.

By variously positioning the switches 82 and 88, different arrangements of the fluid stream or spray may be provided. For example, it is often desirable to provide a fluid spray of only air at lower speeds and then to inject water into the spray at some higher speed. This mode of operation enables the dental tool to be properly positioned and the dental engine to reach an operating speed before water is sprayed in the patient's mouth. To effect a spray of this type, the movable contact of the switch 88 is positioned to the right while the movable contact of the switch 82 is positioned to the left. With the movable contact at a switch position to the left, the solenoid 94 is continuously energized and therefore air continuously passes through the channel 108. However, the solenoid 100 is not energized until the motor 10 reaches some predetermined speed at which time the solenoid is energized and thereafter water is permitted to pass through the valve 102 and channel 106.

Still another desirable mode of operation of the fluid spray is to provide a spray of only air at lower speeds and a spray of only water at higher speeds. To effect this spray arrangement, the movable contacts of both the switches 82 and 88 are positioned to the right. With the switches in these positions, at a lower speed, the solenoid 94 is energized due to the movable contact of the contacts 74 being positioned to the right. However, when the motor 10 reaches a predetermined speed, the movable contact of the contacts 74 is moved to the left thereby de-energizing the solenoid 94 and closing the valve 104, and simultaneously energizing the solenoid 100 and opening the valve 102. The closure of the valve 104 results in cutting-off the air in the channel 108 while the opening of the valve 102 results in permitting water to flow through the channel 106.

The above considerations assume that the reversing switch 50 is in the position shown to cause the motor 10 to rotate in a forward direction. When the switch 50 is reversed to cause the motor 10 to operate in the reverse direction, the parallel connections between the transformer 52 and the variable-resistance circuit 36 are reversed. As a result, the voltage applied to the armature 12 is reversed in polarity while the voltage developed across the field winding 14 is maintained the same. Of course, the result of reversing the voltage polarity across the armature 12 is to reverse the direction of rotation to the motor 10.

Upon changing the reversing switch 50, the return line for the solenoids 94 and 100 through the switch 96, and the line 56 are connected through the variable-resistance circuit 36 and then through the switch 46 to the terminal 48. As a result, the resistance of the variable-resistance circuit is serially connected with the solenoids 94 and 100. This additional impedance in the circuit of the coils 94 and 100 limits the current through these coils and therefore affects their operation. It is therefore necessary to change the current path from the solenoids 94 and 100 during the periods when the reversing switch 50 is in a position different from that shown. This switching operation is performed by the relay 98 motivating contacts 96.

The relay 98 is connected between lines 60 and 118. During the time when the reversing switch 50 is in a position shown, these lines are connected to a common point through the contacts 54 and the reversing switch 50. However, when the reversing switch 50 is changed in state, the lines 60 and 118 are connected across the variable transformer 52 and the variable-resistance circuit 36. As a result, when the voltage across these elements (the variable transformer 52 and the variable-resistance circuit 36) reaches a significant level, the relay 98 is energized to move the movable contact of the contacts 96 to the left. A circuit then exists from the solenoids 94 and 100 through the contacts 96, the line 116, the line 60, the contacts 54, through the reversing switch 50 to the switch 46 and the terminal 48. As a result, the solenoids 94 and 100 are able to operate properly regardless of whether the dental motor 10 is running in a forward or reverse direction.

It is to be noted, that the rectifier 112 and the capacitor 110 serve to rectify the voltage applied to the relay 98 and thereby enable a small direct current relay to be used (which is more sensitive to voltage and prevents solenoid chatter). The resistor 114 is of a rather small value and functions only to limit the transient current through the rectifier 112.

In integrating the system of the present invention with a conventional dental unit system, it may be desirable to provide for a separate fluid spray to be ejected from a handpiece driven by an air turbine. This control may be effected by a system of valves somewhat similar to the valves 102 and 104. The control signal for such valves is developed by the relay 124 in Figure 1.

To use a turbine handpiece, the contacts 32 and 54 are positioned to the right thereby de-energizing the motor 10. With the contacts 32 and 54 positioned to the right, the relay 124 is connected in series with the variable-resistance circuit 36 through the reversing switch 50. When the resistance presented by the variable-resistance circuit 36 is not infinite (at low speeds), the current passing through the relay 124 maintains the contacts 122 open. Therefore, the line 134 which is coupled to a valve that controls the water content in a spray is electrically isolated and as a result, the spray contains no water.

When the variable-resistance circuit 36 presents an infinite resistance (open circuit), then no current may flow through the relay 124 and the contacts 122 close. Closure of the contacts 122 applies the voltage in line 120 to a valve similar to valves 20 and 22, which is opened to provide water in the spray. The line 136, connected to the line 120 receives a voltage during all operating intervals and therefore opens an air valve to form the air spray.

It is to be understood that the spray controlled by the relay 124 is associated with a turbine driven handpiece. The control provided for this spray is effected through the foot control which incorporates the resistance circuit 36, and therefore allows the operator to use the control to which he is accustomed.

By a consideration of the above, it may be seen that many variations in the spray from the nozzle 26 may be effected, and that depending upon the nature of the dental operation being performed, a particular spray arrangement can be selected to provide different sprays.

Figure 2:
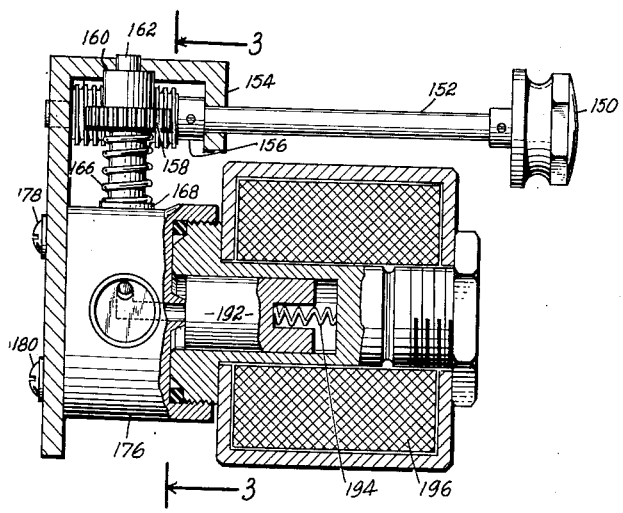
Figure 2 is a partly-sectionalized plan view of a fluid valve constructed in accordance with the present invention.
Figure 3:
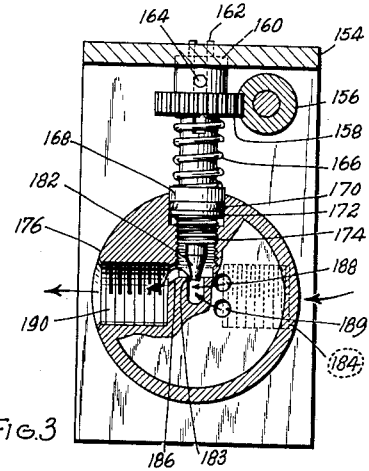
Figure 3 is a vertical sectional view taken along the line 3—3 of Figure 2.

In addition, to the provision of various sprays controlled by the speed of the dental engine, the present invention provides a valve for use as the solenoid-operated valves 20 and 22 which enables precise manual control of the amount of the different fluids in the spray. Reference will now be had to Figures 2 and 3 for a consideration of the valve. Precision manual adjustment of the valve shown is made by a knob 150. The knob 150 is mounted upon a shaft 152 that carries a worm gear 156 and is supported at two points in a mounting bracket 154. The worm gear 156 engages a gear wheel 158 having a collar 160. The gear wheel 158 with its collar 160 are keyed into a longitudinal slot in a shaft 162. The keying engagement is made by a pin 164, or other suitable keying arrangement. As a result of keying arrangement between the wheel 158 and the shaft 162, there exists a positive rotational engagement between these members; however, the members may move relative to each other in a longitudinal direction.

The gear wheel 158 engages a spring 166 that is mounted upon the shaft 162. The spring 166 serves to urge the collar 160 against a recess in the bracket 154 thereby providing a bearing surface for the collar 160. Similarly, the spring 166 engages a collar 168 affixed to the shaft 162 and urges the shaft 162 in a downward direction. Positioned below the collar 168 is an O-ring 170 and a supporting ring 172. Below the supporting ring 172, the shaft 160 carries a threaded section 174. The threaded section 174 of the shaft 160 engages internal threads in a block 176. The block 176 is rigidly attached to the bracket 154 by screws 178 and 180. The block 176 has passageways therethrough and a valve seat for engaging a valve member 182 carried by the shaft 162.

Fluid flows through the valve into a threaded bore 184 in the block 176, then through ports 188 and 189 into the chamber housing the valve member 182. If the valve member 182 is withdrawn from its seat, the fluid may pass through the passage 186 to be discharged through the threaded bore 190. Of course, if the valve member 182 is seated against the seat in the block 176, then the passage is closed and fluid is not permitted to flow.

The passage from the ports 188 and 189 to the valve chamber is through a closed cylindrical chamber housing a piston 192. The piston 192 is urged against the block 176 by a spring 194. The piston 194 is withdrawn from the block 176, to open the passage between the valve seat and the ports 188 and 189, by a solenoid coil 196.

In the operation of the valve shown in Figures 2 and 3, rotation of the knob 150 rotates the worm gear 156 thereby rotating the gear wheel 158. When the gear wheel 158 is revolved, it revolves the shaft 162 due to the keying arrangement provided between these members. It is to be noted, that a bearing support for such movement is provided between the bracket 154 and the collar 160 affixed to the wheel 158.

As the shaft 162 is revolved, it is moved either upwardly or downwardly due to the engagement of the threaded section 174 with threads in the block 176. The relative movement between these members varies the position of the valve member 182 and the valve seat 183, thereby varying the effective dimensions of the passage between these members. The O-ring 170 serves to seal the chamber in the block 176, closed with respect to the movable shaft 162, while the collar 168 engages the block 176 to provide another bearing surface for the shaft 162.

As the shaft 162 is moved up and down relative to the block 176, the spring 166 urges the shaft downwardly so that the lower side of each of the threads of the threaded section 174 firmly engages the threads of the block 176. This firm positive engagement between the threads of the shaft 162 and the threads of the block 176, with the bearing surface provided by the collars 160 and 168 provides extremely good stabilization of the shaft 162. Additionally, the fact that the threaded section 174 is spring-held against the threads of the block 176 assures that the threaded sections are always working against common surfaces and unaffected by backlash between the threads. As a result, any variation between threaded section 174 and the threads in the block 176 is minimized in effect.

It may therefore be seen, that the present invention provides a fine precision valve that may be economically manufactured. Additionally, the valve of this invention has other advantages. The chamber in which the valve member 182 is seated may be relatively large because the precision control is effected by the arrangement between the gears 156 and 158. The fact that this chamber may be relatively large not only has advantages in manufacturing the valve, but also enables the valve to be opened so as to clear obstructing particles from the valve.

It may therefore be seen that the present invention provides an improved apparatus to control a dental spray. And further, that the present apparatus may be easily incorporated for use in conjunction with a conventional dental unit. The invention further provides an operating unit which is positioned within easy reach of the operator and which requires a minimal amount of plumbing.

While there has been shown herein what is considered to be the preferred embodiment of the present invention, it will be apparent that various modifications and changes may be made with respect to the foregoing description without departing from the spirit of the invention or the scope of the following claims.

I claim:

1. In a dental engine wherein a speed-control system is used in conjunction with an electrical motor to drive a dental tool at various speeds, a cooling apparatus comprising: a first valve; means for connecting said valve to a source of water; a second valve; means for connecting said second valve to a source of air; a nozzle adapted to be mounted adjacent said dental tool; conducting means connecting said first and second valves to said nozzle; an electrical means for providing a control signal in response to said speed-control system; means connected to said electrical means for connecting said electrical means to said speed control system; and means connected to said first and second valves and said electrical means for controlling said first and second valves in accordance with said control signal.

2. An apparatus according to claim 1 wherein said electrical means comprises a rectifier circuit for providing a direct-current signal which varies as the speed of said motor.

3. An apparatus according to claim 2 wherein said means for controlling said first and second valves comprises solenoid means for opening said second valve when said motor operates at lower speeds, and for opening said first valve when said motor operates at higher speeds.

4. In a dental engine wherein a speed-control system is used in conjunction with an electrical motor to drive a dental tool at various speeds, a cooling apparatus comprising: valve means having means thereon for connecting said valve means to a source of fluid; a nozzle having means thereon for mounting said nozzle adjacent said dental tool; fluid conducting means connecting said valve means to said nozzle; electrical means for providing a control signal in response to said speed-control system; means connected to said electrical means for connecting said electrical means to said speed control system; and means connected to said electrical means and valve means for controlling said valve means in accordance with said control signal.

5. An apparatus according to claim 4 wherein said valve means is controlled by said electrical signal to open when said speed-control system causes said electrical motor to reach a certain speed.

6. An apparatus according to claim 1 wherein the engine is reversible and said means for controlling said first and said second valves includes switching means for variously connecting said valves in accordance with the direction of rotation of said dental engine.

7. An apparatus according to claim 1, wherein said means for connecting said electrical means to said speed-control system is connected to said speed-control system so that according to the speed of the electric motor control potentials are developed which may be utilized to control water and air.

References Cited in the file of this patent

UNITED STATES PATENTS

| | | |
|---|---|---|
| 2,390,710 | Henschel | Dec. 11, 1945 |
| 2,542,833 | Page | Feb. 20, 1951 |
| 2,587,356 | McPherson | Feb. 26, 1952 |
| 2,742,055 | Seewer | Apr. 17, 1956 |
| 2,788,577 | Cunningham | Apr. 16, 1957 |
| 2,841,745 | Shields | July 1, 1958 |
| 2,855,672 | Franwick et al. | Oct. 14, 1958 |
| 2,902,762 | Madsen | Sept. 8, 1959 |